Nov. 17, 1931.  H. W. ZIMMERMAN  1,832,606
SHACKLE JACK
Filed June 15, 1928  2 Sheets-Sheet 1
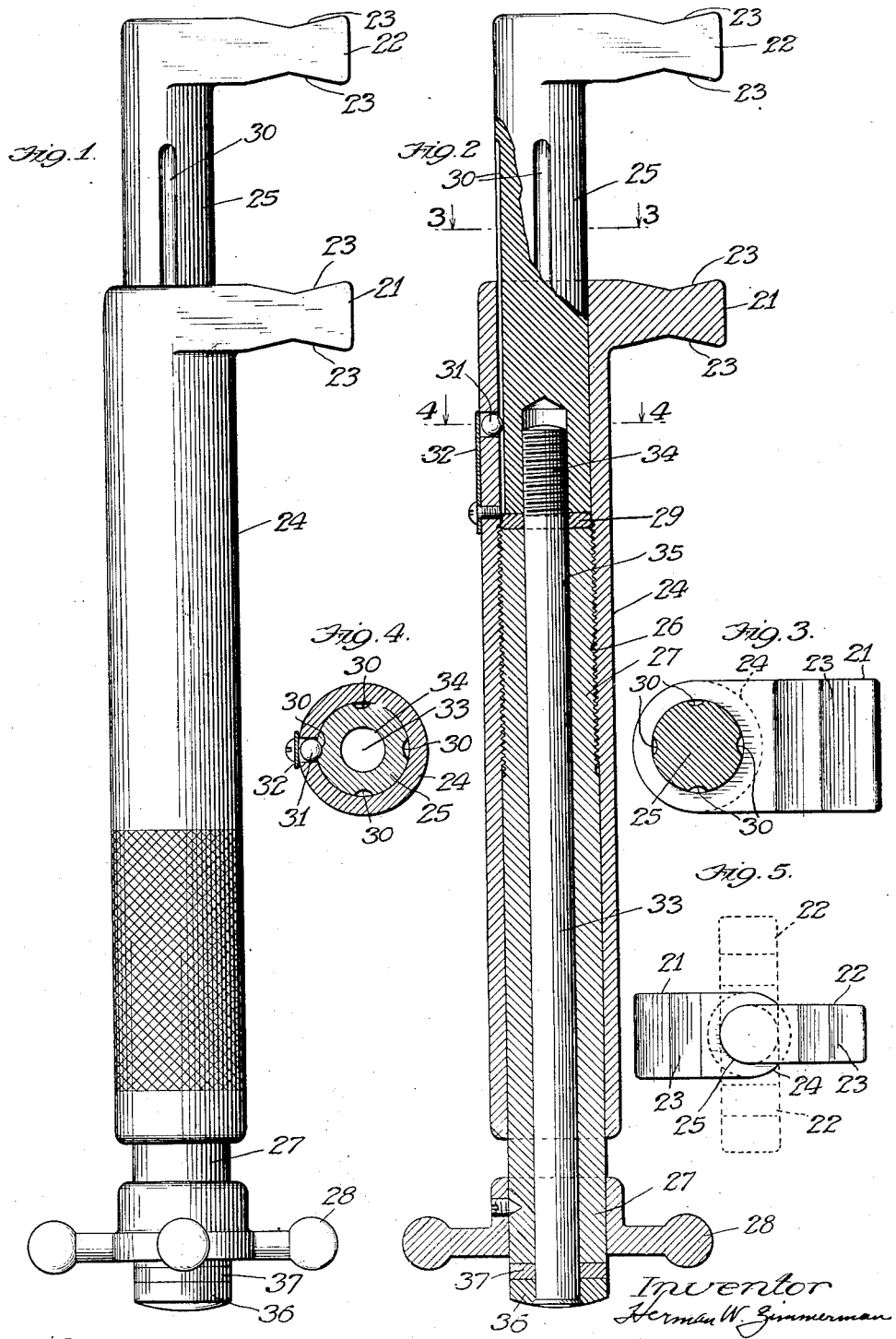

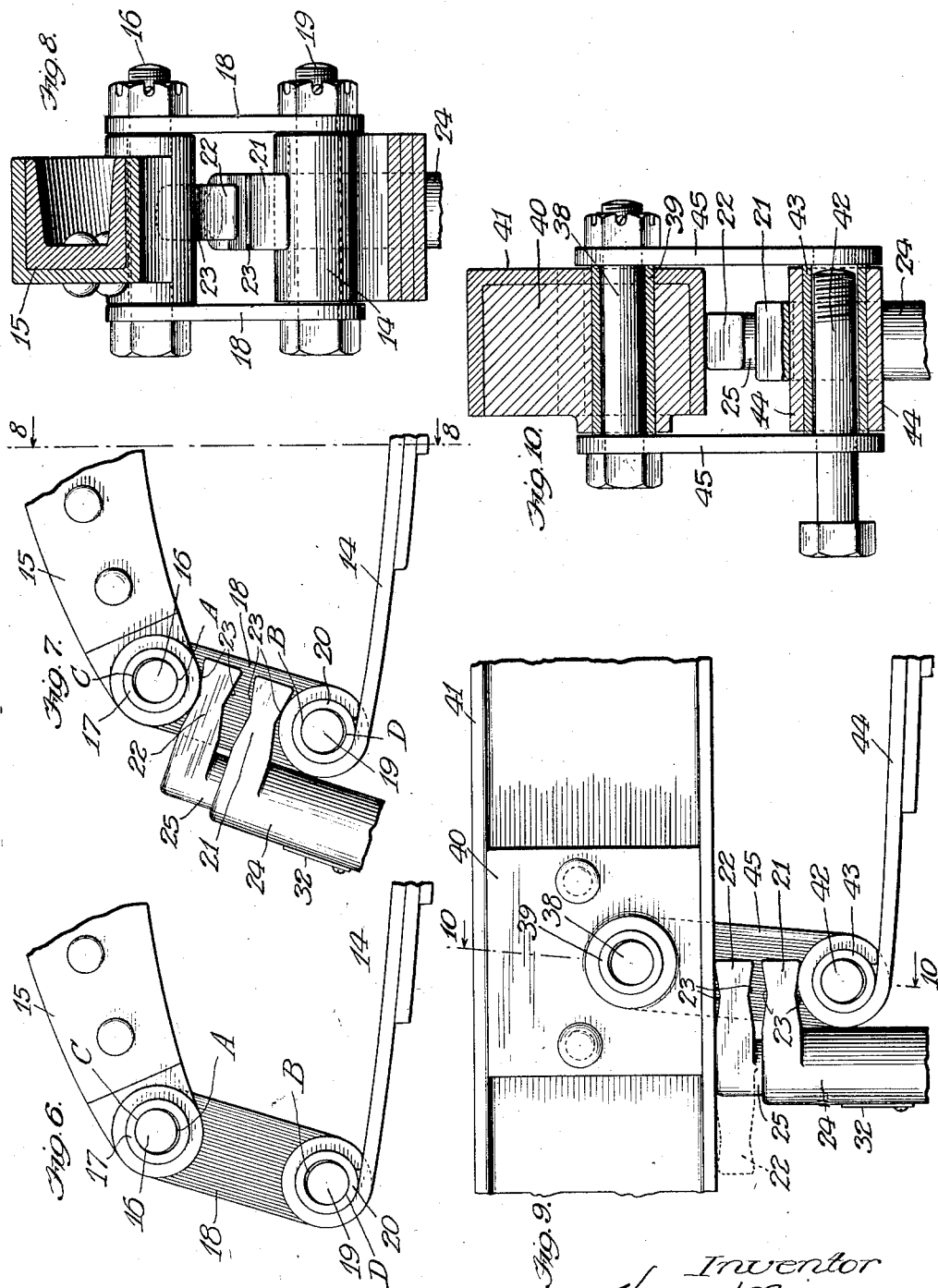

Patented Nov. 17, 1931

1,832,606

UNITED STATES PATENT OFFICE

HERMAN W. ZIMMERMAN, OF CHICAGO, ILLINOIS, ASSIGNOR TO AUTOMOTIVE MAINTENANCE MACHINERY CO., OF CHICAGO, ILLINOIS, A CORPORATION OF ILLINOIS

SHACKLE JACK

Application filed June 15, 1928. Serial No. 285,767.

My invention relates to a shackle jack which is adapted primarily for adjustment of the spring shackles of a motor vehicle to insure proper lubrication of the same, and for supporting the shackled parts for inspection of the shackles and for the replacement or repairing of the shackle bolts and other parts of the shackle structure.

It is well known that the usual shackles employed in the suspension of motor vehicle springs are subjected to severe loads. As the vehicle moves along, the shackles are practically always in motion and they, consequently, tend to wear very rapidly with the result that they soon become noisy and other well-known objectionable conditions exist.

The distribution of the load upon the shackles is such that when a lubricant is applied thereto, it is not evenly distributed throughout the shackle bushing around the shackle bolt and, in fact, the lubrication cannot actually be applied to the load-supporting points where wear takes place more rapidly and where lubrication is most needed.

One of the objects of my invention is to provide for the proper lubrication of the spring shackles so as to reduce the wear-tendency of the same to a minimum. To this end, I provide jack means which is engageable with the shackled parts in such a way as to relieve the load imposed thereon, and which is capable of so adjusting the shackle parts that when a lubrication is applied thereto, it will be evenly distributed throughout the shackle bushing and around the shackle bolt and at the excessive-wear-points.

Much time and effort has heretofore been required in the repairing and replacing of shackle bolts. This work is very laborious and usually involves the use of means for raising and independently supporting the vehicle frame and body so as to remove the weight of the same from the springs and shackles. Another object of my invention is to provide a simple and efficient means adapted to be associated with the shackle parts in such a way as to support the load imposed thereon, and for relieving the load on the shackle bolts to permit the latter to be readily and quickly removed with a minimum of effort. The means which I provide to this end is of a character suited for direct engagement with the shackled parts and which is so adjustable as to hold the shackled parts in their normal spaced-apart positions while the shackle bolts, or other parts, are being removed.

Other objects are to provide a jack device for carrying out the foregoing objects which is exceedingly cheap to manufacture, but which is very strong and durable; to provide a device of this character which is easy to adjust and which is self-locking in any of its adjusted positions; to provide a device having a plurality of gripping jaws, one at least of which is rotatably adjustable to any angular position with respect to the other so as to accommodate the same to a great number of varying conditions, regardless whether the surfaces contacted by such jaws are in vertical alignment or otherwise; and to provide engaging jaws which are suitably shaped for grippingly engaging the contacted parts for both pushing and pulling actions, the jack structure being equally well adapted for the pulling of two objects together as for the spreading of the same apart.

Other objects and advantages will become apparent as this description progresses and by reference to the drawings, wherein,—

Figure 1 is a view in elevation of one form of structure embodying my invention and which is well suited for the adjustment of the spring shackles of both the front and rear springs of motor vehicles.

Fig. 2 is a partial vertical sectional view of the structure shown in Fig. 1;

Fig. 3 is a horizontal section taken substantially on line 3—3 of Fig. 2;

Fig. 4 is a horizontal section taken substantially on line 4—4 of Fig. 2;

Fig. 5 is a reduced top plan view of the jaws of the device shown in Figs. 1 and 2, the jaws being shown in full lines extending in diametrically opposed directions, and one of the jaws being shown in dotted lines in other positions to which it may be rotatively adjusted;

Fig. 6 is a side view of a portion of the rear of a motor vehicle frame and the end part of the rear spring with the shackle bolt nuts and one of the shackle links removed so as to illustrate the manner in which the load is disposed upon the shackle parts;

Fig. 7 is a view similar to Fig. 6, except showing the shackle jack inserted between the frame and spring and adjusted so as to remove the load from the points indicated in Fig. 6;

Fig. 8 is a vertical section taken through the structure of Fig. 7 substantially on line 8—8 thereof;

Fig. 9 is a view similar to Fig. 7 except showing the shackle jack applied to the rear shackle of the front spring of a motor vehicle; and Fig. 10 is a vertical section taken substantially on line 10—10 of Fig. 9 and showing the shackle parts so adjusted by the shackle jack that the load imposed upon the shackle parts is borne by the shackle jack and is removed from the shackle bolts permitting the same to be readily removed.

I have already generally pointed out that the distribution of the load upon the shackle bolts is such that it is practically impossible to apply a lubricant at the load-points where the excessive wear takes place. Specifically, with reference to Fig. 6, it will be seen that the weight of the frame 15 and the parts carried thereby is disposed directly upon the upper shackle bolt 16 so that the upper surface of this bolt and the adjacent surface of the shackle bushing 17 are pressed tightly together while the opposite surfaces are free as indicated at A in Fig. 6. The load upon the shackle bolt 16 is transmitted through the shackle links 18 to the lower shackle bolt 19 with the result that the lower surface of the bolt 19 and adjacent surface of the lower bushing 20 are firmly pressed together and the opposite surfaces thereof, as indicated at B, are free. It will be readily seen that when a lubricant is forced into the shackle bushings 17 and 20, in a manner which is well understood, it will tend to flow along the free spaces indicated at A and B and will not be applied to the opposed tightly-seated surfaces C and D where, naturally, the wear tends to take place more rapidly.

My invention eliminates these undesirable features by the provision of a highly efficient means adapted to cooperate with the shackle structures in such a manner as to relieve the load at the points C and D and adjust such parts so as to render them sufficiently free to permit the lubricant to pass entirely around the shackle bolts and, particularly, at the load-points C and D. Specifically, I provide a so-called shackle jack having a pair of gripping jaws 21 and 22 so associated that the jaw 22 is adjustable toward and from the jaw 21 and is also rotatably adjustable to various angular positions relative to the jaw 21 (see Fig. 5) to readily accommodate the same to the shackled parts regardless of the relative positions which they may assume. These jaws are provided on their opposite sides with cupped surfaces 23 for securely gripping the objects with which they contact and for suitably accommodating the structure for pulling as well as pushing actions.

The structure for accomplishing the relative adjustment of the jaws 21 and 22 under load and other conditions comprises an outer sleeve 24 which integrally carries the jaw 21 at its upper end. The sleeve 24 is provided with an open-ended bore, the upper part of which slidably and rotatably receives a jaw stem 25 which, at its upper end, integrally supports the jaw 22.

The central portion of the sleeve bore is threaded as at 26 to adjustably receive an externally threaded stem 27 which is long enough to project through and beyond the lower end (looking at Fig. 2) of the sleeve 24. A handle 28 is fixed (in any desired manner) upon the outer projecting end of the stem 27 so as to readily rotate the same relative to the sleeve 24. With the construction so far described, it is obvious that with the sleeve 24 held stationary in the hand of the operator, upon rotation of the stem 27 to adjust the same inwardly, the jaw stem 25 and jaw 22 will be forced outwardly to space the jaws apart. A washer 29 is freely disposed between the inner ends of the stems 25 and 27 so that the rotary motion of the stem 27 will not be transmitted to the jaw 22. The jaw 22 and stem 25 may be latched in a plurality of rotary-adjustment positions by a plurality of longitudinal grooves 30 which are engaged by a ball 31 yieldably held in place by the spring 32. While I have shown only four grooves 30, it will be understood that the number of grooves may be varied as desired so as to securely latch the jaw 22 in any desired rotary-adjustment position with respect to the jaw 21.

Positive movement of the jaw 22 inwardly toward the jaw 21 is accomplished by means of a pull rod 33 which is threadedly secured to the innermost end of the stem as at 34. The body of this rod freely passes through an axial opening 35 in the stem 27 permitting of relative rotation between the rod and stem. This rod is sufficiently long to project through and beyond the outer end of the stem 27, and a cap member 36 is secured in any desired manner to such outer projecting end. A washer 37 is freely disposed between the outer end of the stem 27 and the adjacent surface of the cap 36 so as to render the rotary adjusting movements of the stem 27 free without imparting such movement to the pull rod 33. Obviously, with this arrangement as the stem 27 is screwed outwardly, the outward pressure of the same is applied through the washer 37 and cap 36 to the pull rod 33 thereby sliding the stem 25 inwardly.

In the use of this structure in the adjustment of the rear spring shackles for lubrication purposes, the jaws are inserted between the shackle links with the outer cupped surfaces of the jaws engaging, respectively, the ends of the frame 15 and spring 14. The jaws are then spread apart by turning of the handle 28 to spread the ends of the frame and spring apart and thereby relieve the load upon the shackle bolts as indicated in Fig. 7. For lubrication purposes, the shackle bolts may be adjusted to a more nearly axial position within the shackle bushings 17 and 20 than shown in Fig. 7. When this adjustment is made, the shackle bolts and bushings are sufficiently free to permit the lubricant to be forced uniformly therebetween and particularly between the surfaces indicated at C and D where the lubricant is most needed.

Obviously, in the use of my invention, inspection of the shackle structures may be made easily and quickly so that they may always be maintained in the proper working condition. The load upon the shackle bolts may be removed by the jack structure so as to permit the bolts to be easily removed as indicated in Fig. 10. The shape of the jack structure is such that it may be readily applied to the shackles from different positions to avoid interference offered by bumpers and other equipment on the motor vehicle. For example, the jack may be applied to the rear shackle from a direction opposite that indicated in Fig. 7 and this may be done with the same high degree of efficiency as if it were applied in the manner shown. My invention further provides, as will be obvious from Figs. 7 to 10, inclusive, for the supporting of the shackled parts in their normally-shackled positions while the shackle bolts are being removed whereby the removal of such bolts is greatly facilitated and the use of additional supporting devices is unnecessary.

This jack structure is suited not only for the rear spring shackles, but also for the shackles of front vehicle springs as illustrated in Figs. 9 and 10. In Fig. 9, the shackle structure is of a well known form in which the upper shackle bolt 38 and bushing 39 supported by a block 40 secured to the usual frame channel member 41, and in which the lower shackle bolt 42 and bushing 43 are associated with the front spring 44, these shackle parts being connected together by the shackle links 45. In this instance, the upper jack jaw 22 engages the under side of the lower web of the frame channel 41 and the lower jaw engages the adjacent eye-end of the spring. The adjustment of the shackle parts is carried out similarly to that described in connection with the rear shackle structure of Figs. 7 and 8. In some forms of front spring suspension, the parts of the shackle structures with which the jaws contact are not always in vertical alignment. In that case, the upper jaw, as above explained, is adjustable so that it may be rotated to the desired angular position relative to the jaw 21 so as to find a desired contacting surface for supporting the parts for the desired adjustments, inspection, etc. One such angular position of the jaw 22 is indicated in dotted lines in Fig. 9.

I have not shown my invention applied to objects for a pulling action. However, it will be well appreciated that by engaging the objects to be pulled together with the inner cupped faces of the jaws 21 and 22 and by rotating the handle 28 so as to pull the stem 25 and jaw 22 inwardly, such objects will be pulled together. This may be accomplished easily and quickly in the manner already made clear. The various adjusting parts are so associated that when an adjustment is once accomplished, it is maintained until changed by the operator.

While I have shown only one form of my jack structure and have shown it applied in only two shackle combinations, it will be understood that it may be varied in details and arrangements of parts and may be used in other combinations where similar problems exist, without departing from the spirit and scope of my invention as defined by the claims which follow.

I claim:

1. In a device adapted to be applied to spring shackles for supporting the shackled parts to permit adjustment of the shackle parts, an outer sleeve adapted to be stationarily supported, a jaw carried at one end of said sleeve and shaped to securely engage one of the shackled parts, a stem slidably and rotatably mounted within said sleeve and carrying a jaw shaped similarly to said first jaw and adapted to engage the other of the shackled parts, and means associated with said stem and said sleeve for slidably adjusting said latter jaw toward and from said first jaw to similarly adjust the engaged shackled parts, and means for holding said latter jaw in rotatably adjusted positions.

2. A device adapted for adjusting vehicle spring shackles including shackle bolts, shackle bushings and shackle links and for supporting the shackled parts in their normally shackled positions for inspection and replacement of said shackle parts, including a sleeve member adapted to be stationarily supported, a jaw carried by said member adapted to engage one of the shackled parts, a stem member slidably and rotatably mounted within said sleeve member, a jaw carried by said stem member and similar to said first jaw for engaging the other of the shackled parts, and means including a second stem having internal threaded engagement with said sleeve member and free-abutment engagement with said first stem member for adjusting said second stem member longitudinally to move its jaw toward and from said first jaw.

3. In a device adapted to be applied to spring shackles for supporting the shackled parts and to permit adjustment of the shackle parts, an outer sleeve, a pressure jaw on one end of said sleeve, a stem slidably and rotatably carried by said sleeve and projecting through the end thereof adjacent said jaw, another pressure jaw carried by the projecting end of said steam, means for adjusting said stem slidably relative to said sleeve to spread and close said jaws, and means for latching said rotatable jaw in a plurality of rotary-adjustment positions with respect to said first jaw.

4. In a device adapted to be applied to spring shackles for supporting the shackled parts and to permit adjustment of the shackle parts, an outer sleeve, a pressure jaw on one end of said sleeve, a stem slidably and rotatably carried by said sleeve and projecting through the end thereof adjacent said jaw, another pressure jaw carried by the projecting end of said stem, means including a member having threaded engagement with said sleeve and abutment engagement with said stem for adjusting said stem slidably relative to said sleeve to spread and close said jaws, and spring latch means supported by said sleeve and engageable with said stem for latching said rotatable jaw in a plurality of rotary-adjustment positions with respect to said first jaw.

5. In a device adapted to be applied to spring shackles for supporting the shackled parts and to permit adjustment of the shackle parts, an outer open-ended sleeve, a pressure jaw carried at one end of said sleeve, a stem member slidably mounted within the end of said stem adjacent said jaw, another pressure jaw carried by said stem, and means for adjusting said latter jaw toward and from the other jaw comprising an adjusting stem mounted within and screw-threadedly engaging said sleeve and having one end abuttingly associated with the inward end of said jaw stem member and its other end projecting through the end of said sleeve opposite said jaws, a pull rod secured to the inward end of said jaw stem member and freely passing through said adjusting stem for relative rotational movements, a member on the outer end of said rod in free abutment engagement with the adjacent end of said adjusting stem, and a handle on said adjusting stem for rotating the latter in one direction to force said jaw stem member outwardly and in the opposite direction to pull said rod to move said stem member inwardly.

6. In a device adapted to be applied to spring shackles for supporting the shackled parts and to permit adjustment of the shackle parts, an outer open-ended sleeve, a pressure jaw carried at one end of said sleeve, a stem member slidably and rotatably mounted within the end of said stem adjacent said jaw, another pressure jaw carried by said stem, means for adjusting said latter jaw toward and from the other jaw comprising an adjusting stem mounted within and screw-threadedly engaging said sleeve and having one end abuttingly associated with the inward end of said jaw stem member and its other end projecting through the end of said sleeve opposite said jaws, a pull rod secured to the inward end of said jaw stem member and freely passing through said adjusting stem for relative rotational movements, a member on the outer end of said rod in free abutment engagement with the adjacent end of said adjusting stem, a handle on said adjusting stem for rotating the latter in one direction to force said jaw stem member outwardly and in the opposite direction to pull said rod to move said jaw stem member inwardly, and means associated with said sleeve and stem member for latching the latter in a plurality of its rotary-adjusted positions.

7. In a device adapted to be applied to spring shackles for supporting the shackled parts and to permit adjustment of the shackle parts, a sleeve adapted to be stationarily supported, a jaw formed at one end of said sleeve and shaped to securely fit to one of the shackled parts, a stem member slidably and rotatably mounted in and projecting through the end of said sleeve adjacent said jaw, another jaw formed on the outer end of said stem and shaped to securely fit to the other of the shackled parts, and means rotatable relative to said sleeve and supported thereby in abutment and pulling engagement with said stem for adjusting said jaws to remove the weight of the shackled parts from the shackles and support such parts in normally shackled positions and to restore the weight to the shackles and to disengage said jaws.

8. In a device adapted to be applied to spring shackles for supporting the shackled parts and to permit adjustment of the shackle parts, a sleeve adapted to be stationarily supported, a jaw formed at one end of said sleeve and shaped to securely fit to one of the shackled parts, a stem member slidably and rotatably mounted in and projecting through the end of said sleeve adjacent said jaw, another jaw formed on the outer end of said stem and shaped to securely fit to the other of the shackled parts, and means rotatable relative to said sleeve and supported thereby in abutment engagement with said stem for adjusting said jaws to remove the weight of the shackled parts from the shackles and support such parts in normally shackled positions, and means for latching said stem in a plurality of rotative positions.

9. In a device of the character described, a cylindrical sleeve having a threaded open-ended bore, a gripping jaw on one end of said sleeve, a jaw stem slidably and rotatably mounted in said sleeve bore and projecting through its end adjacent said jaw, another gripping jaw on the projecting end of said stem, an exteriorly threaded adjusting stem in said sleeve in engagement with the threaded bore of the latter and in both abutting and pulling engagement with said jaw stem, and means for rotating said adjusting stem to spread and close said jaws.

10. In a device of the character described, a cylindrical sleeve having a threaded open-ended bore, a gripping jaw on one end of said sleeve, a jaw stem slidably and rotatably mounted in said sleeve bore and projecting through its end adjacent said jaw, another gripping jaw on the projecting end of said stem, an exteriorly threaded adjusting stem in said sleeve in engagement with the threaded bore of the latter and in both abutting and pulling engagement with said jaw stem, and means for rotating said adjusting stem to spread and close said jaws, said abutting engagement being provided by a washer element freely mounted in said sleeve between the inner ends of said jaw and adjusting stems, and said pulling engagement being provided by a pull rod connected to the inner end of said jaw stem and passing freely through said adjusting stem with the outer end of said rod in free abutment engagement with the outer end of said adjusting stem.

In testimony whereof, I have subscribed my name.

HERMAN W. ZIMMERMAN.